(12) United States Patent
Takaoka et al.

(10) Patent No.: US 9,567,455 B2
(45) Date of Patent: Feb. 14, 2017

(54) RUBBER COMPOSITION, METHOD FOR MANUFACTURING SAME, VULCANIZED RUBBER, AND TIRE

(71) Applicants: BRIDGESTONE CORPORATION, Tokyo (JP); MITSUBISHI CHEMICAL CORPORATION, Tokyo (JP); OJI HOLDINGS CORPORATION, Tokyo (JP)

(72) Inventors: Saaya Takaoka, Tokyo (JP); Hideko Akai, Yokohama (JP); Rie Shirahama, Yokohama (JP); Yasutomo Noishiki, Tokyo (JP); Yuichi Noguchi, Tokyo (JP)

(73) Assignees: BRIDGESTONE CORPORATION, Tokyo (JP); OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 14/773,773

(22) PCT Filed: Mar. 14, 2014

(86) PCT No.: PCT/JP2014/056972
§ 371 (c)(1),
(2) Date: Sep. 9, 2015

(87) PCT Pub. No.: WO2014/142319
PCT Pub. Date: Sep. 18, 2014

(65) Prior Publication Data
US 2016/0032086 A1   Feb. 4, 2016

(30) Foreign Application Priority Data
Mar. 14, 2013 (JP) ................. 2013-051533

(51) Int. Cl.
| | |
|---|---|
| *C08K 3/04* | (2006.01) |
| *C08L 7/00* | (2006.01) |
| *B60C 1/00* | (2006.01) |
| *C08K 9/04* | (2006.01) |
| *C08L 7/02* | (2006.01) |
| *C08J 3/205* | (2006.01) |
| *C08L 21/00* | (2006.01) |

(52) U.S. Cl.
CPC . *C08L 7/00* (2013.01); *B60C 1/00* (2013.01); *C08J 3/2053* (2013.01); *C08K 9/04* (2013.01); *C08L 7/02* (2013.01); *C08L 21/00* (2013.01); *B60C 2011/145* (2013.04); *C08J 2300/26* (2013.01); *C08L 2205/16* (2013.01)

(58) Field of Classification Search
CPC .............................. C08L 7/00; C08L 2205/16
USPC ........................................................ 524/495
See application file for complete search history.

(56) References Cited

U.S. PATENT DOCUMENTS

| | | | | |
|---|---|---|---|---|
| 3,845,013 | A | * 10/1974 | Robin | ........... C07C 323/00 524/331 |
| 5,376,726 | A | 12/1994 | Noyama et al. | |
| 2006/0142420 | A1 | 6/2006 | Nakazawa et al. | |
| 2010/0076118 | A1* | 3/2010 | Yano | ........... B60C 1/00 523/351 |
| 2013/0005869 | A1* | 1/2013 | Yano | ........... C08B 11/145 524/43 |

FOREIGN PATENT DOCUMENTS

| | | |
|---|---|---|
| CN | 1717465 A | 1/2006 |
| JP | 04-328139 A | 11/1992 |
| JP | 10-007811 A | 1/1998 |
| JP | 2002-226501 A | 8/2002 |
| JP | 2005-075856 A | 3/2005 |
| JP | 2005-133025 A | 5/2005 |
| JP | 2009-084564 A | 4/2009 |
| JP | 2009-091388 A | 4/2009 |
| JP | 2009-263417 A | 11/2009 |
| JP | 2011-162608 A | 8/2011 |
| JP | 2012-25949 A | 2/2012 |

OTHER PUBLICATIONS

Yakubu et al., Journal of Reinforced Plastics and Composites, 29, 18, 2855-2868, 2010.*
M.K. Yakubu et al., "Physico-mechanical Effects of Surface-modified Sorgum Stalk Powder on Reinforced Rubber", Journal of Reinforced Plastics and Composites, Mar. 2010, pp. 2855-2868, vol. 29, No. 18.
International Search Report for PCT/JP2014/056972 dated Apr. 15, 2014.
Communication dated Feb. 5, 2016 from the European Patent Office in counterpart application No. 14762992.7.
Database WPI; Week 201212; Thomson Scientific, London, GB; XP 002753496; 1 pg. total.
Communication dated Jun. 24, 2016 from the State Intellectual Property Office of the P.R.C. in counterpart Application No. 201480015398.4.

\* cited by examiner

*Primary Examiner* — Hui Chin
(74) *Attorney, Agent, or Firm* — Sughrue Mion, PLLC

(57) ABSTRACT

Provided are a rubber composition provided with excellent reinforcement properties by improving the dispersibility of fibers in a rubber component when the fibers are added to the rubber, a method for manufacturing the same, a vulcanized rubber, and a tire. A rubber composition comprising a rubber component and short fibers, wherein the short fibers are cationized. A method for manufacturing the rubber composition, comprising a mixing step for mixing cationized short fibers and rubber latex to prepare a rubber-short fiber mixed solution, and a drying step for drying the rubber-short fiber mixed solution to give a rubber composition.

9 Claims, 1 Drawing Sheet

RUBBER COMPOSITION, METHOD FOR MANUFACTURING SAME, VULCANIZED RUBBER, AND TIRE

CROSS REFERENCE TO RELATED APPLICATIONS

This application is a National Stage of International Application No. PCT/JP2014/056972 filed Mar. 14, 2014, claiming priority based on Japanese Patent Application No. 2013-051533 filed Mar. 14, 2013, the contents of all of which are incorporated herein by reference in their entirety.

TECHNICAL FIELD

The present invention relates to a rubber composition, a method for manufacturing the same (hereinafter also referred to simply as "manufacturing method"), vulcanized rubber, and a tire, and particularly relates to a rubber composition comprising short fibers, a method for manufacturing the same, vulcanized rubber, and improvement in a tire including the same.

BACKGROUND ART

Techniques are conventionally known in which fibers are mixed with rubber used for rubber goods, such as tires, to improve properties such as hardness and modulus. In such techniques, fibers with a large fiber diameter tend to disperse well in rubber but reduce rubber physical properties such as fatigue resistance, whereas fibers with a small fiber diameter tend to improve the fatigue resistance but be entangled with each other and disperse poorly in rubber.

Against this, there is proposed mixed yarn fibers having a sea-island cross-section, which are dispersed in rubber and become fibrillated by a shearing force at mixing to increase the area of contact with rubber, whereby both dispersibility and fatigue resistance can be achieved (see Patent Document 1). These fibers, however, form a sea-island structure due to phase separation of resin and therefore have ununiform thicknesses and lengths, and have diameters as large as 1 μm and 0.7 μm as described in an example, meaning that the size of the area of contact with rubber is less than sufficient; therefore, a great reinforcing effect cannot be expected.

Examples of Patent Document 2 disclose that for improved wear resistance, addition of bacterial cellulose having a very small fiber diameter of 0.1 μm together with starch that serves as a reinforcing agent to diene rubber improves the wear resistance index as compared to addition of starch alone. In Patent Document 2, however, it is described that addition of cellulose alone has a problem with processability, and starch is added in an amount five times or more the amount of cellulose. It is considered that the starch is added in an attempt to improve the dispersibility because bacterial cellulose is dispersed to nano sizes in water but tends to aggregate in rubber, but in this case, it is expected that the reinforcing effect is balanced out by the starch, and the reinforcing effect is still not sufficient.

Patent Document 3 discloses examples in which impalpable powder cellulose fibers with an average particle size of 40 μm are introduced in a dry state into a rubber composition together with a silane coupling agent, and kneaded in a Banbury mixer. However, just by kneading in a mixer, it is difficult to break hydrogen bonds between the cellulose fibers caused in a dry state to make the cellulose fibers into fibers with a small diameter, and in this case, the cellulose fibers are considered to be dispersed in the rubber still in the form of particles with an average particle size of 40 μm. Therefore, the reinforcing effect of thin long fibers cannot be expected.

Furthermore, Patent Document 4 discloses a vulcanized rubber composition containing a rubber component comprising at least one of natural rubber, modified natural rubber, and synthetic rubber, and chemically modified microfibril cellulose, and discloses examples in which modified microfibril cellulose with an average fiber diameter of 0.1 μm is mixed with the rubber component. The examples disclose stirring microfibril cellulose in advance in water using a rotary homogenizer to prepare a dispersion, introducing rubber latex thereinto, and mixing the resultant at 7000 rpm for 10 minutes. In this case, although a rotary homogenizer is used, the fibers tend to aggregate before water is removed, and a shearing force sufficient to disentangle the aggregated fibers is not produced at such a rotation speed. In the document, the absence of an aggregate is visually confirmed, but actually, it is not clear that at what thickness the microfibril cellulose is dispersed in the rubber.

Furthermore, Patent Document 5 proposes using as cellulose fibers obtained by graft polymerization of a diene polymer to increase the affinity and dispersibility in a rubber component. In this case, however, fibers defibrated in water are subjected to graft treatment in tetrahydrofuran (THF), and at this treatment, the fibers defibrated once in water are considered to reaggregate. If strong intermolecular hydrogen bonds are formed once, it is difficult to defibrate the fibers to nano sizes again.

RELATED ART DOCUMENTS

Patent Documents

Patent Document 1: JP H10-7811 A
Patent Document 2: JP 2005-133025 A
Patent Document 3: JP 2005-75856 A
Patent Document 4: JP 2009-84564 A
Patent Document 5: JP 2009-263417 A

SUMMARY OF THE INVENTION

Problems to be Solved by the Invention

As described above, various rubber compositions obtained by adding fibers to rubber, and various techniques for improving the physical properties of rubber goods including the same have hitherto been proposed, but none of them are satisfactory. For example, to provide high strength or reduce loss, it is necessary to disperse fibers uniformly in a rubber component. In combining the rubber and the fibers, however, the fibers are likely to aggregate in a mixing step or a drying step, and it is difficult to achieve uniform dispersion. Furthermore, when rubber latex is used, particles of the latex have a great influence. Thus, it has been demanded to establish a technique for solving these problems and improving the reinforcement properties of the rubber compositions.

Thus, it is an object of the present invention to solve the problems described above and provide a rubber composition provided with excellent reinforcement properties by improving the dispersibility of fibers in a rubber component when the fibers are added to the rubber, a method for manufacturing the same, a vulcanized rubber, and a tire.

Means for Solving the Problems

The present inventors intensively studied to discover that imparting a charge opposite to the charge of rubber latex to short fibers can bond the short fibers to rubber particles and improve the dispersibility of the short fibers, whereby the problems described above can be solved, thereby completing the present invention.

Thus, the rubber composition of the present invention is a rubber composition comprising a rubber component and short fibers, wherein the short fibers are cationized. In the rubber composition of the present invention, the amount of the cationized short fibers is preferably 0.1 to 50 parts by mass based on 100 parts by mass of the rubber component.

The method for manufacturing a rubber composition according to the present invention is a method for manufacturing the rubber composition of the present invention, comprising a mixing step for mixing the cationized short fibers and rubber latex to prepare a rubber-short fiber mixed solution, and a drying step for drying the rubber-short fiber mixed solution to give a rubber composition.

Furthermore, another method for manufacturing a rubber composition according to the present invention is a method for manufacturing the rubber composition of the present invention, wherein in a mixing step for mixing the cationized short fibers and rubber latex to prepare a rubber-short fiber mixed solution, the rubber-short fiber mixed solution is separated into two layers. In this case, it is preferred that in the mixing step, after the rubber-short fiber mixed solution is separated into two layers, a layer composed mainly of water be removed.

In the manufacturing method of the present invention, it is preferred that prior to the mixing step, the cationized short fibers are added into a liquid to prepare a short fiber dispersion, and in the mixing step, the short fiber dispersion and the rubber latex is mixed. Furthermore, in the mixing step, it is preferable to further add at least one dispersant selected from the group consisting of carbon black and inorganic compounds, and in this case, the amount of the dispersant is preferably 0.1 to 100 times the amount of the cationized short fibers. Furthermore, in the manufacturing method of the present invention, it is also preferred that in the mixing step, the dispersant is mixed with the mixture of the cationized short fibers and the rubber latex. Furthermore, in the manufacturing method of the present invention, it is also preferred that prior to the mixing step, the dispersant is added into a liquid, which may be the same as or different from the above-described liquid, to prepare a dispersant dispersion, and in the mixing step, the dispersant dispersion is mixed.

Furthermore, the vulcanized rubber of the present invention is obtained by vulcanizing the rubber composition of the present invention. Furthermore, the tire of the present invention comprises the vulcanized rubber of the present invention.

Effects of the Invention

According to the present invention, by employing the above structure, the dispersibility of fibers in a rubber component can be improved when the fibers are added to the rubber, whereby a rubber composition provided with excellent reinforcement properties, a method for manufacturing the same, a vulcanized rubber, and a tire can be achieved.

MODE FOR CARRYING OUT THE INVENTION

Embodiments of the present invention will now be described in detail.

The rubber composition of the present invention is characterized by comprising a rubber component and short fibers and using those which are cationized (hereinafter also referred to as "cationized short fibers") as the short fibers.

Figure 1:
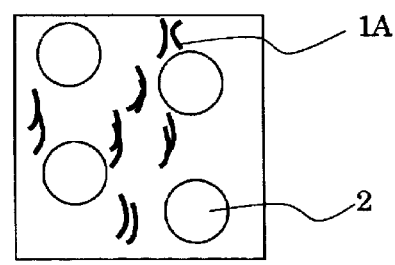
FIGS. 1(a) and 1(b) are drawings illustrating states where uncationized short fibers or cationized short fibers are mixed with rubber latex.
Figure 1:
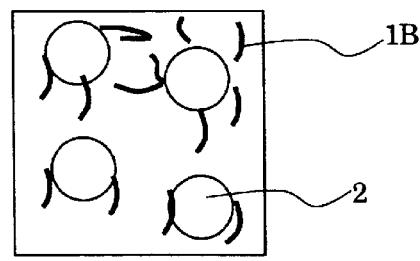

In the present invention, short fibers are cationized in advance and then mixed with a rubber component, whereby the short fibers are dispersed well in the resulting rubber composition, allowing improvement in reinforcement properties of the rubber composition. Specifically, as shown in FIG. 1(a), when uncationized short fibers 1A are mixed with rubber latex, the short fibers 1A aggregate in the mixture, and good dispersion cannot be achieved. In contrast, as shown in FIG. 1(b), by cationizing short fibers 1B to have a charge opposite to the charge of latex, the short fibers 1B, when mixed with rubber latex, are ionically bonded to rubber particles and repel each other in the mixture; therefore, aggregation of the short fibers 1B is prevented, and consequently, good dispersion can be achieved. In addition, when a dispersant as described below is added to the rubber composition, since the cationized short fibers are ionically bonded also to anionic dispersants, the components are more likely to be uniformly dispersed in the rubber composition, and physical properties will be improved more than when the short fibers are anionized or uncationized. Furthermore, cationized short fiber-containing rubber has a high modulus, and also in this regard, the cationization can contribute to the improvement in breaking strength of the rubber composition.

<Short Fibers>

As mentioned above, in the present invention, the desired effect can be obtained if the short fibers are those which are cationized, and therefore there is no particular restriction on the short fibers for use in the present invention, and examples include regenerated fibers such as wood cellulose fibers and wood pulp fibers, synthetic fibers such as nylon fibers and aramid fibers, inorganic fibers such as silicon carbide fibers and carbon fibers, and steel fibers. Such short fibers, specifically, have a number average fiber length in the range of 100 nm to 1 mm, particularly 100 nm to 5 μm, a number average fiber diameter in the range of 4 nm to 10 μm, particularly 4 nm to 50 nm, and an aspect ratio in the range of 10 to 1000, particularly 20 to 250. In particular, the present invention is advantageous particularly when fine cellulose fibers (cellulose nanofibers), which are obtained by defibrating cellulose fibers and have a number average fiber diameter on the order of nanometers, are used as the short fibers. The fine cellulose fibers as used herein are those which have a number average fiber diameter in the range of 1 to 1000 nm and a number average fiber length in the range of 0.1 to 100 μm. The cellulose fibers from which the fine cellulose fibers are made will be described below.

<Cellulose Fibers>

The cellulose fibers may be of any type as long as they are materials from which the fine cellulose fibers are made and are substances containing cellulose (cellulose-containing substance) or a cellulose-containing substance that has been subjected to purification and the like (cellulose fiber raw material). As the cellulose fibers, cellulose may be used, and cellulose containing some impurities may be used. In particular, the cellulose fibers for use in the present invention are preferably cellulose-containing substances from which impurities are removed by purification.

Examples of cellulose-containing substances include natural celluloses, for example, woods such as softwood and hardwood; cottons such as cotton linter and cotton lint; lees of bagasse, beet pulp and the like; bast fibers of flax, ramie, jute, kenaf, and the like; leaf fibers of sisal, pineapple, and the like; petiole fibers of abaca, banana, and the like; fruit fibers of coconut and the like; plant-derived materials such as base fibers of bamboo and the like; bacterial cellulose produced by bacteria; seaweeds such as Valoniaceae and Cladophoraceae; and cysts of Ascidiacea. These natural celluloses are preferred in that they have high crystallinity and therefore provide a low coefficient of linear expansion and a high elastic modulus. In particular, cellulose fibers obtained from plant-derived materials are preferred. Bacterial cellulose is preferred in that it is likely to provide fibers with a very small fiber diameter. Furthermore, cotton is preferred in that it is also likely to provide fibers with a very small fiber diameter and that its raw material is readily available. Furthermore, woods such as softwood and hardwood also provide fibers with a very small fiber diameter, and they are economically advantageous in that they are biological resources of the largest amount on earth and sustainable resources which are said to be produced in an amount of about 70,000,000,000 tons or more per year, and therefore greatly contribute to the reduction of carbon dioxide which has an influence on global warming. The woods, when used as the cellulose fibers of the present invention, are preferably crushed into wood chips, wood flour, or the like for use.

(Purification Method)

In the present invention, the cellulose-containing substance is subjected to purification treatment (purification step), as required, to remove substances other than cellulose in the cellulose-containing substance, for example, lignin, hemicellulose, resin, and the like.

Examples of the purification method include, but are not limited to, degreasing treatment, delignification treatment, and hemicellulose removal treatment. One example is a method in which the cellulose-containing substance is degreased with benzene-ethanol, delignified by Wise's method, and then subjected to hemicellulose removal treatment with an alkali.

As the delignification treatment, in addition to the Wise's method, a method using peracetic acid (pa method), a method using a mixture of peracetic acid and persulfuric acid (pxa method), or the like is also used. In addition, bleaching treatment may optionally be performed using chlorine, ozone, sodium hypochlorite, hydrogen peroxide, chlorine dioxide, or the like.

As the purification method, common methods for manufacturing chemical pulp, for example, methods for manufacturing kraft pulp, sulfite pulp, alkaline pulp, and nitric acid pulp may be used. Alternatively, a method may be used in which the cellulose-containing substance is subjected to treatments such as delignification by heating in a digester, and further to bleaching treatment and the like.

For the purification treatment, water is commonly used as a dispersion medium, but an acid or base, or an aqueous solution of other treating agents may be used, in which case washing treatment with water may finally be performed. The cellulose-containing substance may be crushed into wood chips, wood flour, or the like, and this crush may be carried out at any timing, before, during, or after the purification treatment.

For the purification treatment of the cellulose-containing substance, an acid or base, or other treating agents are typically used, and they may be of any type. Examples include sodium carbonate, sodium hydrogen carbonate, sodium hydroxide, potassium hydroxide, magnesium hydroxide, sodium sulfide, magnesium sulfide, sodium sulfite, calcium sulfite, magnesium sulfite, ammonium sulfite, sodium sulfate, sodium thiosulfate, sodium oxide, magnesium oxide, calcium oxide, acetic acid, oxalic acid, sodium hypochlorite, calcium hypochlorite, sodium chlorite, sodium chlorate, chlorine dioxide, chlorine, sodium perchlorate, sodium thiosulfate, hydrogen peroxide, ozone, hydro sulfite, anthraquinone, dihydrodihydroxyanthracene, tetrahydroanthraquinone, anthrahydroquinone, alcohols such as ethanol, methanol, and 2-propanol, and water-soluble organic solvents such as acetone. These treating agents may be used alone or in combination of two or more.

Furthermore, two or more purification treatments may be performed using two or more treating agents, in which case it is preferable to perform washing treatment with water between the purification treatments using different treating agents.

The temperature and the pressure during the purification treatment are not limited to particular values. The temperature is preferably selected in the range of 0° C. to 100° C., and in the case of a treatment under a pressure of over 1 atmosphere, the temperature is preferably 100° C. to 200° C.

The cellulose fibers obtained by purifying the cellulose-containing substance are typically obtained in a hydrous state (in the form of an aqueous dispersion). Examples of the cellulose fiber raw material obtained by purifying the cellulose-containing substance include hardwood kraft pulp, softwood kraft pulp, hardwood sulfite pulp, softwood sulfite pulp, bleached hardwood kraft pulp, bleached softwood kraft pulp, and linter pulp.

(Fiber Diameter)

The cellulose fibers for use in the present invention are preferably processed for use to a size in the following range, for example, by purifying, cutting, or crushing the cellulose-containing substance described above. For example, when the cellulose-containing substance is used in the form of chips or the like with a size of several centimeters, it is preferable to mechanically process the chips with a macerator, such as a refiner or a beater, to about several millimeters. The cutting or crush of the cellulose-containing substance, when treatment such as the purification of the cellulose-containing substance described below is performed, may be carried out at any timing, before, during, or after the treatment. For example, when before the purification treatment, an impact crusher, a shear crusher, or the like may be used, and when during or after the purification treatment, a refiner or the like may be used.

The fiber diameter of the cellulose fibers for use in the present invention is not limited to a particular value, and in terms of defibration efficiency in the defibration treatment described below and handleability, the number average fiber diameter is preferably 1 µm to 1000 µm, more preferably 5 µm to 100 µm. It is noted that cellulose fibers after being typical purified have a fiber diameter of about several tens of µm (preferably 10 to 50 µm).

The number average fiber diameter can be measured by any method, and it can be determined by observing the cellulose fibers under a scanning electron microscope (SEM), a transmission electron microscope (TEM), or the like, drawing a diagonal line on the micrograph, randomly selecting 12 fibers in the vicinity of the diagonal line, and averaging the measurements of 10 fibers excluding the thickest fiber and the thinnest fiber.

(Modification)

In the present invention, the cellulose fibers for use are preferably those in which hydroxyl groups in cellulose have been modified (substituted) with any other groups, specifically, those which have been derivatized by chemical modification (chemically-modified cellulose fibers), for example, those in which hydroxyl groups in cellulose have been modified (substituted) upon reaction with a chemical modifier. Chemical modification as used herein means that hydroxyl groups in cellulose are derivatized into any other groups or substituted with any other groups by chemical reaction. The chemical modification may be carried out before or after the purification treatment mentioned above, and from the viewpoint of efficient reaction of the chemical modifier, it is preferable to chemically modify the cellulose after the purification treatment (cellulose fiber raw material).

There is no particular limitation on the substituent introduced into hydroxyl groups in cellulose (group introduced through substitution with hydrogen atoms in hydroxyl groups) through chemical modification, and any groups having a structure similar to the skeleton of a rubber component used may be selected taking into account the affinity for the rubber component. Examples include acyl groups such as acetyl, acryloyl, methacryloyl, propionyl, propioloyl, butyryl, 2-butyryl, pentanoyl, hexanoyl, heptanoyl, octanoyl, nonanoyl, decanoyl, undecanoyl, dodecanoyl, myristoyl, palmitoyl, stearoyl, and pivaloyl; isocyanate groups such as 2-methacryloyloxyethylisocyanoyl; alkyl groups such as methyl, ethyl, propyl, 2-propyl, butyl, 2-butyl, tert-butyl, pentyl, hexyl, heptyl, octyl, nonyl, decyl, undecyl, dodecyl, myristyl, palmityl, and stearyl; oxirane; oxetane; thiirane; thiethane; and carboxyl. Of these, $C_2$-$C_{12}$ acyl groups such as acetyl, acryloyl, and methacryloyl, and carboxyl are particularly preferred.

More specifically, $X_1$, $X_2$, and $X_3$ in the following formula (1) are preferably substituents listed above.

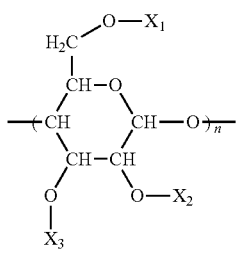

(1)

Another embodiment of $X_1$, $X_2$, and $X_3$ is an aromatic ring-containing substituent. The aromatic ring-containing substituent is a substituent derived from a hydrocarbon aromatic compound, a heterocyclic aromatic compound, or a nonbenzenoid aromatic compound. The hydrocarbon aromatic compound is a monocyclic compound of a benzene ring or a compound in which 2 to 12 benzene rings are condensed, such as benzene, naphthalene, or anthracene. The number of condensation is preferably 6 or less. The heterocyclic aromatic compound is a monocyclic compound of a 5- to 10-membered heterocyclic ring, such as furan, thiophene, pyrrole, or imidazole, or a compound in which 2 to 12 5- to 10-membered heterocyclic rings are condensed. The number of condensation is preferably 6 or less. Examples of nonbenzenoid aromatic compounds include annulenes, cyclopentadienyl anions, cycloheptatrienyl cations, tropones, metallocenes, and acepleiadylene.

Of these, substituents derived from hydrocarbon aromatic compounds and heterocyclic aromatic compounds are preferred, and substituents derived from hydrocarbon aromatic compounds are more preferred. Furthermore, substituents derived from benzene, naphthalene, and anthracene are particularly preferred. In these aromatic ring-containing substituents, hydrogen in the substituent may be substituted with a $C_1$-$C_{12}$ alkyl group. Furthermore, two or more aromatic ring-containing substituents selected from the group consisting of the above-described hydrocarbon aromatic compounds, heterocyclic aromatic compounds, and nonbenzenoid aromatic compounds may be linked to each other via a single bond or a $C_1$-$C_3$ alkylene group.

For the aromatic ring-containing substituent, the linking group for bonding an aromatic ring and cellulose is not limited to a particular group as long as it results from the reaction with hydroxyl groups in cellulose. For example, the aromatic ring may be directly bonded to O (oxygen atom) in the above formula, or may be bonded to O (oxygen atom) of cellulose via a linking group such as —CO— or —CONH—, particularly preferably via —CO—.

As the aromatic ring-containing substituent of the substituent introduced into cellulose in the cellulose fibers, benzoyl, naphthoyl, anthroyl, nicotinoyl, isonicotinoyl, furoyl, and cinnamoyl are preferred, and benzoyl is particularly preferred. Introducing aldehyde or carboxyl into the primary hydroxyl group at 6-position of cellulose is one method of introducing the substituent into cellulose.

(Modifier)

The modification may be carried out by any method including reacting cellulose with a chemical modifier listed below.

Examples of chemical modifiers include acids, acid anhydrides, and halogenation reagents (which are used to form an ester group); alcohols, phenolic compounds, alkoxysilanes, phenoxysilanes, and cyclic ether compounds such as oxirane (epoxy) (which are used to form an ether group); isocyanate compounds (which are used to form a carbamate group); and ozone, chlorine gas, fluorine gas, chlorine dioxide, nitrous oxide, and N-oxyl compounds such as 2,2,6,6,-tetramethyl-piperidine-1-oxyl (TEMPO) (which are used to form a carboxyl group). Dicarboxylic acids may also be reacted. Examples of dicarboxylic acids include oxalic acid, malonic acid, succinic acid, glutaric acid, adipic acid, pimelic acid, suberic acid, azelaic acid, phthalic acid, fumaric acid, maleic acid, isophthalic acid, and terephthalic acid. These chemical modifiers may be used alone or in combination of two or more.

Examples of acids, chemical modifiers to form an ester group, include acetic acid, acrylic acid, methacrylic acid, propanoic acid, butanoic acid, 2-butanoic acid, pentane acid, benzoic acid, and naphthalenecarboxylic acid, and examples of acid anhydrides include acetic anhydride, acrylic anhydride, methacrylic anhydride, propanoic anhydride, butanoic anhydride, 2-butanoic anhydride, pentanoic anhydride, benzoic anhydride, phthalic anhydride, maleic anhydride, and succinic anhydride. Examples of halogenation reagents include acetyl halide, acryloyl halide, methacryloyl halide, propanoyl halide, butanoyl halide, 2-butanoyl halide, pentanoyl halide, benzoyl halide, naphthoyl halide, and stearoyl chloride.

Examples of alcohols, chemical modifiers to form an ether group, include methanol, ethanol, propanol, and 2-propanol. Examples of phenolic compounds include phenol and naphthol. Examples of alkoxysilanes include methoxysilane, ethoxysilane, and phenoxysilane. Examples of cyclic ethers include ethyloxirane, ethyloxetane, oxirane (epoxy), and phenyloxirane (epoxy). Examples of isocyanate compounds, chemical modifiers to form a carbamate group, include methyl isocyanate, ethyl isocyanate, propyl isocyanate, and phenyl isocyanate. Of these, acetic anhydride, acrylic anhydride, methacrylic anhydride, benzoyl halide, and naphthoyl halide are particularly preferred.

These chemical modifiers may have a functional group reactive with a rubber component at a site other than the site reactive with hydroxyl groups in cellulose. Examples of such functional groups include mercapto, alkenyl, (meth) acryloyl, and halogens. These chemical modifiers may be used alone or in combination of two or more.

(Chemical Modification Method)

The chemical modification can be carried out by any known method. Specifically, the chemical modification can be carried out by reacting cellulose with a chemical modifier according to a conventional method. In this reaction, if desired, a solvent and a catalyst may be used, and for example, heating and pressure reduction may be performed.

When cellulose fibers after purification (cellulose fiber raw material) are used, since these cellulose fibers are typically in a hydrous state, it is preferable to replace water with a reaction solvent to inhibit the reaction between the chemical modifier and water as much as possible. If the cellulose fibers are dried in order to remove water, fibrillation of the cellulose fibers is less likely to proceed in the defibrating step described below, and therefore it is not preferable to perform the drying step.

The amount of the chemical modifier, which is not limited to a particular value and varies depending on the type of the chemical modifier, is preferably at least 0.01 times, more preferably at least 0.05 times, and preferably up to 100 times, more preferably up to 50 times the number of moles of hydroxyl groups in cellulose.

As the solvent, a water-soluble organic solvent that does not inhibit esterification is preferably used. Examples of water-soluble organic solvents include organic solvents such as acetone and pyridine, and organic acids such as formic acid, acetic acid, and oxalic acid, and organic acids such as acetic acid are particularly preferred. Using an organic acid such as acetic acid enables uniform chemical modification of cellulose, facilitating the defibration described below, and the resulting cellulose fiber composite may exhibit high heat resistance and high productivity. Any other solvent than the above may be used in combination. The amount of the solvent used, although not limited to a particular value, is typically, preferably at least 0.5 times, more preferably at least 1 time, and preferably up to 200 times, more preferably up to 100 times the mass of cellulose.

As the catalyst, a basic catalyst such as pyridine, triethylamine, sodium hydroxide, or sodium acetate, or an acidic catalyst such as acetic acid, sulfuric acid, or perchloric acid is preferably used. The amount of the catalyst, which is not limited to a particular value and varies depending on the type, is typically preferably at least 0.01 times, more preferably at least 0.05 times, and preferably up to 100 times, more preferably up to 50 times the number of moles of hydroxyl groups in cellulose.

There is no particular limitation on the temperature conditions, but too high temperature can cause yellowing of cellulose or result in a low degree of polymerization, and too low temperature may decrease the reaction rate; therefore, the temperature is preferably 10 to 130° C. The reaction time, which is also not limited to a particular value and varies depending on the chemical modifier and the chemical modification rate, is from a few minutes to several tens of hours. The chemical modification may be carried out by bringing the cellulose fibers into contact with gas. For example, the cellulose fibers are oxidized by holding them in an atmosphere containing oxidizing gas such as ozone for a given time, or exposing them to oxidizing gas stream, whereby hydroxyl groups in cellulose can be substituted.

After the chemical modification was carried out as described above, it is preferable to wash the cellulose fibers thoroughly with an organic solvent or water to terminate the reaction. The unreacted chemical modifier, if left behind, may disadvantageously cause coloration later or present a problem in combining with a resin.

(Chemical Modification Rate)

The chemical modification rate is a percentage of chemically modified hydroxyl groups in the total hydroxyl groups in cellulose, and when, for example, a monovalent acid is bonded to cellulose via an ester bond, the chemical modification rate can be determined by the titration method described below.

(Method for Measurement)

Dried chemically modified cellulose are accurately weighed to 0.05 g, and 6 ml of methanol and 2 ml of distilled water are added thereto. The resulting mixture is stirred at 60 to 70° C. for 30 minutes, and then 10 ml of 0.05 N aqueous sodium hydroxide solution is added. The resulting mixture is stirred at 60 to 70° C. for 15 minutes, and further stirred at room temperature for one day. Using phenolphthalein, the resultant is titrated with 0.02 N aqueous hydrochloric acid solution.

From the amount Z (ml) of the 0.02 N aqueous hydrochloric acid solution required for the titration, the number of moles Q of the substituent introduced through chemical modification can be determined by the following equation.

$$Q(\text{mol}) = \{0.05(N) \times 10 \text{ (ml)}/1000\} - \{0.02(N) \times Z \text{ (ml)}/1000\}$$

The relationship between the number of moles Q of the substituent and the chemical modification rate X (mol %) is calculated by the following equation (Cellulose= $(C_6O_5H_{10})_n=(162.14)_n$, number of hydroxyl groups per repeating unit=3, molecular weight of OH=17). In the following equation, T is the sum of the molecular weight of the substituent and the atomic weight of oxygen (16).

$$\frac{\text{Sample quantity}}{162.14 + (T-17) \times \frac{3X}{100}} = \frac{Q}{\frac{3X}{100}}$$

This equation is solved to give the following.

$$X = \frac{100}{3} \times \frac{162.14 \times Q}{\left\{\frac{\text{Sample}}{\text{quantity}} - Q \times (T-17)\right\}}$$

In the present invention, the chemical modification rate described above is not limited to a particular value, and preferably at least 1 mol %, more preferably at least 5 mol %, and particularly preferably at least 10 mol % based on the total hydroxyl groups in cellulose. It is preferably up to 65 mol %, more preferably up to 50 mol %, and still more preferably up to 40 mol %. Within this range, the fine cellulose fibers in a dispersion exhibit improved dispersion stability, and when combined with a rubber component, a rubber composition with a low coefficient of linear expansion is provided.

As a dispersion medium for dispersing the cellulose fibers, water is typically used, but an organic solvent (dispersion medium) may also be used. When an organic solvent is used, to use an aqueous dispersion of cellulose fibers, such as the cellulose fiber raw material, as the cellulose fibers, water in the aqueous dispersion may be replaced in advance with the organic solvent (solvent replacement step). The solvent can be replaced by any method, for example, a method including removing water from an aqueous dispersion containing cellulose fibers (preferably, purified or chemically modified cellulose fibers) by filtration or the like, adding thereto an organic solvent to be used in defibration, stirring and mixing the resulting mixture, and removing the organic solvent again by filtration. By repeating the addition of the organic solvent and filtration, the medium in the dispersion can be changed from water to the organic solvent. In cases where the organic solvent used is water-insoluble, the organic solvent may be replaced once with a water-soluble organic solvent, which is then replaced with a water-insoluble organic solvent.

(Defibration Method)

Defibrating the cellulose fibers described above can provide fine cellulose fibers suitable as the short fibers in the present invention. In the present invention, defibration is to disentangle a fiber typically to a smaller size. In this defibration treatment, one or more of protic polar solvents, such as water and alcoholic solvents, and aprotic polar solvents, such as ketone solvents, glycol ether solvents, amide solvents, and aromatic hydrocarbons, may be added. Preferred are, for example, water, amide solvents, alcoholic solvents, and ketone solvents. Such a solvent preferably has a boiling point that is not too high because the solvent will be removed in a subsequent step. The boiling point of the solvent is preferably not higher than 300° C., more preferably not higher than 200° C., and still more preferably not higher than 180° C. In terms of handleability and the like, it is preferably at least 70° C. The defibration step may be carried out by any method, specifically, for example, by placing ceramic beads with a diameter of about 1 mm into a cellulose fiber dispersion with a cellulose fiber concentration of 0.5 to 50% by mass, for example, about 1% by mass, and shaking the dispersion using a paint shaker, a bead mill, or the like to defibrate the cellulose fibers.

Other methods include passing such a raw material dispersion through a blender-type disperser or a high-speed rotating slit to apply a shearing force for defibration (high-speed rotary homogenizer), reducing the pressure rapidly from a high pressure to generate a shearing force between cellulose fibers for defibration (high-pressure homogenizer method), and using a counter-collision disperser such as Masscomizer X (manufactured by Masuko Sangyo Co., Ltd.). In other words, methods include defibration treatment using a bead mill, defibration (fibrillation) treatment through jetting, defibration treatment by a rotary defibration method, and defibration treatment through ultrasonication. In particular, treatments using a high-speed rotary homogenizer and a high-pressure homogenizer provide improved defibration efficiency.

When the defibration is carried out using the above treatments, the solids concentration of the cellulose fiber dispersion, although not limited to a particular value, is preferably at least 0.5% by mass, more preferably at least 1% by mass, and preferably not more than 99% by mass, more preferably not more than 50% by mass. When the solids concentration of the cellulose fiber dispersion subjected to the defibrating step is too low, the liquid amount is too large relative to the amount of cellulose treated, leading to low efficiency, and too high a solids concentration leads to poor flowability.

In the case of high-speed rotary homogenizers, higher peripheral speeds provide a greater shearing force, leading to higher defibration efficiency. The peripheral speed is 15 m/s or higher, preferably 30 m/s or higher, and not higher than 100 m/s, preferably not higher than 50 m/s. The peripheral speed and the number of rotations satisfy the following relationship.

Peripheral speed (m/sec)=2×radius (m) of rotary blade× π×number of rotations (rpm)/60

Therefore, when a rotary blade with a radius of 15 mm is used, the number of rotations is preferably, for example, about 10000 rpm or more, and particularly preferably about 20000 rpm or more. The upper limit of the number of rotations, although not limited to a particular value, is preferably about 30000 rpm or less from the viewpoint of apparatus performance. If the number of rotations is 5000 rpm or less, the cellulose fibers will be insufficiently defibrated. The processing time is preferably at least 1 minute, more preferably at least 5 minutes, and particularly preferably at least 10 minutes. The processing time is preferably not longer than 6 hours in terms of productivity. In cases where heat is generated by shearing, it is preferable to cool the system such that the liquid temperature will not be over 50° C. Furthermore, it is preferable to stir or circulate the raw material dispersion to receive uniform shearing.

When a high-pressure homogenizer is used, the cellulose fiber dispersion is pressurized with a pressure intensifier preferably to 30 MPa or more, more preferably to 100 MPa or more, still more preferably to 150 MPa or more, and particularly preferably to 220 MPa or more, and jetted through a nozzle with an orifice diameter of 50 μm or more to reduce the pressure such that the pressure difference is preferably 30 MPa or more, more preferably 80 MPa or more, and still more preferably 90 MPa or more. By the cleavage phenomenon caused by the pressure difference, the cellulose fibers are defibrated. In this process, when the pressure at the high-pressure condition is low or when the pressure difference between the high-pressure condition and the reduced-pressure condition is small, the defibration efficiency disadvantageously decreases, and more repeating jetting frequencies are required to achieve the desired fiber diameter. Also when the diameter of the orifice through which the cellulose fiber dispersion is jetted is too large, a sufficient defibration effect is not produced, in which case, cellulose fibers with a desired fiber diameter may not be obtained even if the jetting treatment is repeatedly performed.

The jetting of the raw material dispersion may be repeated a plurality of times as required to thereby increase the degree of fibrillation and provide cellulose fibers with a desired fiber diameter. The number of repetitions (number of passes) is typically at least once, preferably at least 3 times, and typically up to 20 times, preferably up to 15 times. A larger number of passes can increase the degree of fibrillation, but an excessively large number of passes disadvantageously leads to increased cost.

The high-pressure homogenizer apparatus is not limited to a particular one, and for example, products by Gaulin and "Starburst System" by Sugino Machine Limited can be used. The higher the high-pressure condition in jetting, the more frequently the cleavage phenomenon occurs because of a greater pressure difference, promoting further fibrillation, but the upper limit according to the specifications of the apparatus is typically up to 245 MPa. Similarly, the pressure difference between the high-pressure condition and the reduced-pressure condition is also preferably larger; in general, however, jetting is carried out from the pressurized condition made by a pressure intensifier to an atmospheric pressure, and therefore the upper limit of the pressure difference is typically up to 245 MPa.

When the diameter of the orifice through which the cellulose fiber dispersion is jetted is small, a high-pressure condition can be easily created, but an excessively small diameter leads to low jetting efficiency. The orifice diameter is preferably 50 μm or more, more preferably 100 μm or more, still more preferably 150 μm or more, and preferably 800 μm or less, more preferably 500 μm or less, still more preferably 350 μm or less. The temperature (dispersion temperature) during jetting, although not limited to a particular value, is typically 5° C. to 100° C. Too high a temperature may disadvantageously accelerate the deterioration of the apparatus, specifically, for example, a feed pump and high-pressure sealed units.

The number of jet nozzles may be either one or two, and the jetted raw material dispersion may be struck against a wall, a ball, or a ring provided on a target of jetting. When the number of nozzles is two, the cellulose fiber dispersions may be struck against each other at the target of jetting.

It is noted that a dispersion containing fine cellulose fibers can be obtained only by such a treatment using a high-pressure homogenizer, but in that case, a larger number of repetitions is necessary to achieve a sufficient degree of fibrillation, resulting in low treatment efficiency; thus, it is preferable to perform the ultrasonic treatment described below for further fibrillation after the high-pressure homogenizer treatment is performed once to about five times.

In the present invention, the cellulose concentration in the cellulose fiber dispersion after being subjected to defibration treatment and before being subjected to ultrasonic treatment is preferably at least 0.5% by mass, more preferably at least 1% by mass, and preferably not more than 50% by mass, more preferably not more than 40% by mass based on the total amount of the dispersion. When the cellulose concentration in the cellulose fiber dispersion to be irradiated with ultrasonic waves is too low, the efficiency is low, and too high a concentration increases the viscosity, resulting in ununiform defibration.

The cellulose fiber dispersion obtained through the above defibrating step, in which the fine cellulose fibers are uniformly dispersed, and aggregation and sedimentation of the fine cellulose fibers are inhibited, has excellent liquid stability.

(Cellulose I-Type Crystal)

The fine cellulose fibers obtained through the above defibrating step preferably have a cellulose I-type crystal structure. The cellulose I-type crystal, which has a higher crystalline modulus than those of other crystal structures, advantageously has a high elastic modulus, a high strength, and a low coefficient of linear expansion. The fine cellulose fibers can be identified as having the I-type crystal structure from a diffraction profile determined by wide-angle X-ray diffractometry, wherein there are two typical peaks at $2\theta$=approximately 14 to 17° and $2\theta$=approximately 22 to 23°.

(Number Average Fiber Diameter, Number Average Fiber Length, and Aspect Ratio of Fine Cellulose Fibers)

The number average fiber diameter, number average fiber length, and aspect ratio of fine cellulose fibers in the cellulose fiber dispersion obtained by the method described above can be determined by drying off the dispersion medium in the cellulose fiber dispersion, and then observing and measuring the fine cellulose fibers by SEM, TEM, or the like. The number average fiber diameter of the defibrated fine cellulose fibers obtained by the present invention, to provide the resulting composite with a more excellent low linear expansivity, is preferably 400 nm or less, more preferably 100 nm or less, and still more preferably 50 nm or less. The lower limit of the number average fiber diameter is typically at least 4 nm. When the number average fiber diameter is smaller than this range, the I-type crystal of cellulose is broken, and the strength and the elastic modulus of the fibers themselves are low, making it difficult to produce a reinforcing effect. When the number average fiber diameter is larger than the above range, the area of contact with rubber is small, which results in a small reinforcing effect. The number average fiber diameter, the number average fiber length, and the aspect ratio are values obtained by observing the fine cellulose fibers by SEM, TEM, or the like, drawing a diagonal line on the micrograph, randomly selecting 14 fibers in the vicinity of the diagonal line, measuring the fiber diameter, fiber length, and aspect ratio of at least 10 fibers excluding the thickest fiber, the thinnest fiber, the longest fiber, and the shortest fiber, and averaging the measurements.

The fine cellulose fiber content in the cellulose fiber dispersion, which is adjusted as appropriate according to the amount of cellulose fibers (starting material) used, in terms of dispersion stability, is preferably at least 0.5% by mass, more preferably at least 1% by mass, and preferably not more than 50% by mass, more preferably not more than 40% by mass, still more preferably not more than 30% by mass based on the total amount of the cellulose fiber dispersion.

<Cationization>

Examples of the method for cationization reaction in the present invention include the method described in JP 2011-162608 A. Any cationizing agent may be used as long as it has a structure having an ammonium group and a reactive group that reacts with hydroxyl groups in cellulose to form a covalent bond, and particularly preferred is a cationizing agent of glycidyltrialkylammonium halide, such as glycidyltrimethylammonium chloride or 3-chloro-2-hydroxypropyltrimethylammonium chloride, or a halohydrin derivative thereof as it is highly reactive with cellulose and has a quarternary ammonium group in its structure to provide a good dispersed state in rubber latex.

<Rubber Component>

Rubber components are roughly classified into natural rubber and synthetic rubber, and in the present invention, these may be used either alone or in combination. The synthetic rubber can be selected from known ones depending on the intended use, and examples include butyl rubber (IIR), butyl bromide rubber (Br-IIR), nitrile rubber (NBR), styrene/butadiene rubber (SBR), butadiene rubber (BR), isoprene rubber (IR), acrylonitrile-butadiene rubber, and chloroprene rubber.

The amount of the cationized short fibers is preferably 0.1 to 50 parts by mass, more preferably 0.1 to 10 parts by mass based on 100 parts by mass of the rubber component. When the amount of the cationized short fibers is too small, a sufficient short fiber dispersibility-improving effect may not be produced, and when it is too large, aggregation of the fibers proceeds, both of which are unfavorable.

The rubber composition in the present invention can be prepared, specifically, by the following procedure. First, the cationized short fibers described above and rubber latex are mixed to prepare a rubber-short fiber mixed solution (mixing step). There is no particular limitation on the method of preparing the rubber-short fiber mixed solution, and it can be prepared by mixing the components used. Specifically, for example, the rubber-short fiber mixed solution can be prepared by stirring a mixture of the short fibers and rubber latex using a homogenizer. The stirring with a homogenizer can be carried out, for example, under the conditions of 10000 to 20000 rpm for 5 to 20 minutes.

In the rubber-short fiber mixed solution obtained as described above, the cationized short fibers are uniformly dispersed, and therefore the rubber-short fiber mixed solution, in which aggregation and sedimentation of the short fibers are inhibited, has excellent liquid stability. Furthermore, as described below, the rubber composition and the vulcanized rubber obtained using the rubber-short fiber mixed solution containing the cationized short fibers and the rubber component, in which the short fibers are uniformly dispersed in the rubber component, each exhibit a high elastic modulus and a low loss tangent.

In the above mixing step, a short fiber dispersion prepared in advance by adding the cationized short fibers into a liquid may be mixed with rubber latex. This achieves both the dispersion of fibers and dispersion of rubber, and in general, a great dispersibility-improving effect can be produced compared to when the cationized short fibers are introduced into rubber. There is no particular limitation on the method of preparing the short fiber dispersion, and it can be prepared by mixing the components used. As the liquid into which short fibers, particularly, cellulose fibers are added, the same water or organic solvent as used for the defibration treatment described above can be used as appropriate. When fine cellulose fibers are used as the short fibers, the cellulose fiber dispersion obtained by the defibration treatment described above, by cationizing the fine cellulose fibers therein, can be used as it is as the short fiber dispersion.

In the present invention, it is preferable, in the above mixing step, to further add at least one dispersant selected from the group consisting of carbon black and inorganic compounds together with rubber latex and cationized short fibers. Since the cationized short fibers bind also to such a dispersant, not only the breaking strength can be further enhanced, but also the dispersant intervenes between the short fibers to prevent aggregation of the short fibers, further improving the dispersibility of the short fibers in the rubber component; consequently, the resulting rubber composition can be provided with further improved reinforcement properties.

The dispersant is preferably mixed with cationized short fibers prior to rubber latex. This is because a cationizing agent binds to the dispersant, and further binds and adheres to rubber latex. Alternatively, prior to the mixing step, the dispersant may be added in advance into a liquid to prepare a dispersant dispersion, which may be added after the process of mixing rubber latex and a short fiber dispersion. By adding the dispersant in the form of a dispersion, the dispersibility of the short fibers can be further improved. The liquid used to prepare the dispersant dispersion may be the same as or different from the liquid used to prepare the short fiber dispersion.

<Dispersant>

As the dispersant for use in the present invention, at least one selected from the group consisting of carbon black and inorganic compounds is used, which are materials that themselves do not aggregate in a liquid such as water and can be dispersed into short fibers. There is no particular limitation on the carbon black, and it may be appropriately selected from those which are commonly used in the rubber industry, and examples include SRF, GPF, FER, HAF, ISAF, and SAF. There is no particular limitation also on the inorganic compound, and examples include silica, sodium silicate, clay, aluminum silicate, calcium carbonate, aluminum hydroxide, titanium oxide, magnesium silicate, magnesium oxide, alumina, and alumina hydrate. The dispersant is more preferably bindable to surface groups of short fibers. In the present invention, particularly among the foregoing, carbon black can be suitably used as the dispersant.

The amount of the dispersant is preferably 0.1 to 100 times, more preferably 5 to 30 times the amount of cationized short fibers. Too small an amount of the dispersant may not produce a sufficient short fiber dispersibility-improving effect, and too large an amount of the dispersant may affect the break properties and loss, both of which are unfavorable.

(Other Additives)

To the rubber-short fiber mixed solution described above, other compounding agents conventionally used in the rubber industry may be added as required, in addition to the cationized short fibers and the rubber component, and the optional dispersant. For example, other reinforcing agents include inorganic and organic fillers such as silica particles, carbon black, and fibers, silane coupling agents, vulcanizing agents as described below, vulcanization accelerators and vulcanization acceleration aids such as stearic acid, amines, zinc oxide, and magnesium oxide, oil, curing resin, wax, and age resistors.

(Vulcanizing Agent)

As the vulcanizing agent, an organic peroxide or a sulfur-based vulcanizing agent can be used. Various organic peroxides conventionally used in the rubber industry can be used, and particularly preferred are dicumyl peroxide, t-butylperoxy benzene, and di-t-butylperoxy-diisopropylbenzene. Examples of sulfur-based vulcanizing agents include sulfur and morpholine disulfide, and sulfur is particularly preferred. These vulcanizing agents may be used alone or in combination of two or more.

The amount of the vulcanizing agent in the rubber-short fiber mixed solution described above, in the case of sulfur, is about 7.0 parts by mass or less, preferably 6.0 parts by mass or less, and 1.0 parts by mass or more, preferably 3.0 parts by mass or more, particularly 4.0 parts by mass or more based on 100 parts by mass of the rubber component.

The rubber-short fiber mixed solution is then dried to give the rubber composition of the present invention (drying step). In the drying step, the rubber-short fiber mixed solution may be dried, for example, in a vacuum oven at 50 to 150° C. for 1 to 16 hours. In the present invention, the rubber composition of the present invention can be obtained also by separating the rubber-short fiber mixed solution into two layers in the above mixing step. In this case, after the rubber-short fiber mixed solution is separated into two layers, the layer composed mainly of water may be removed.

In the present invention, if desired, the rubber composition obtained through the drying step may be further mixed with the rubber component and the above-described various compounding agents using a known method, such as a rubber kneader, and then the resulting mixture is molded and vulcanized according to a conventional method, whereby a vulcanized rubber containing fine cellulose fibers and a vulcanized rubber component can be obtained. For the molding before the vulcanizing step, various methods can be used. For example, the rubber composition may be applied to a substrate as a coating, cast into a mold, or extruded, and there is no particular limitation.

For example, when the vulcanized rubber is used for a tire, the rubber composition is appropriately kneaded, extruded in an unvulcanized state into a shape of a tire member for a desired application, and molded together with other tire members with a tire molding machine using a conventional method to form an unvulcanized tire (green tire). The unvulcanized tire is hot-pressed in a vulcanizer, whereby a tire can be obtained including a vulcanized rubber obtained by vulcanizing the rubber composition of the present invention. This vulcanized rubber has excellent break properties, and thus, the tire including the same will have a low rolling resistance, good controllability, and durability.

There is no particular limitation on the vulcanization conditions for preparing a vulcanized rubber, and temperatures and times that can process the rubber component into a vulcanized rubber may be used. In particular, the heating temperature is preferably 60° C. or higher, more preferably 100° C. or higher, at which temperatures an organic solvent can be volatilized off, and preferably not higher than 250°

C., more preferably not higher than 200° C., at which temperatures decomposition of fine cellulose fibers is prevented. The heating time, in terms of, for example, productivity, is at least 5 minutes, preferably at least 10 minutes, more preferably at least 15 minutes, and preferably not longer than 180 minutes. The vulcanization of the rubber composition may be carried out for a plurality of times varying temperatures and heating times.

<Vulcanized Rubber>

(Number Average Fiber Diameter of Fine Cellulose Fibers)

The number average fiber diameter of the fine cellulose fibers in the vulcanized rubber obtained by the method described above can be determined by cutting the vulcanized rubber as required, and observing and measuring the vulcanized rubber by SEM, TEM, or the like.

The number average fiber diameter of the fine cellulose fibers, to provide the resulting vulcanized rubber with a more excellent low linear expansivity, is preferably 400 nm or less, more preferably 100 nm or less, and still more preferably 50 nm or less. The lower limit of the number average fiber diameter is typically at least 4 nm. When the number average fiber diameter is smaller than this range, the I-type crystal structure of cellulose cannot be maintained, and the strength and the elastic modulus of the fibers themselves are low, making it difficult to produce a reinforcing effect. When the number average fiber diameter is larger than the above range, the area of contact with rubber is small, which results in a small reinforcing effect. The number average fiber diameter is a value obtained by observing the fine cellulose fibers by SEM, TEM, or the like, drawing a diagonal line on the micrograph, randomly selecting 12 fibers in the vicinity of the diagonal line, measuring 10 fibers excluding the thickest fiber and the thinnest fiber, and averaging the measurements.

(Fine Cellulose Fiber Content)

The fine cellulose fiber content in the vulcanized rubber is appropriately adjusted depending on the intended use, and from the viewpoint of reinforcement properties, it is preferably at least 0.5% by mass, more preferably at least 1% by mass, and preferably not more than 50% by mass, more preferably not more than 40% by mass, still more preferably not more than 30% by mass based on the total amount of the vulcanized rubber.

The mass ratio of the fine cellulose fibers to the rubber component contained in the vulcanized rubber is the same as the mass ratio of the cellulose fibers to the rubber component in the rubber-short fiber mixed solution described above. A small fiber content does not produce a sufficient reinforcing effect, whereas a large fiber content may reduce the processability of the rubber.

(Dispersed State of Fine Cellulose Fibers)

In the vulcanized rubber of the present invention thus obtained, fine cellulose fibers having a number average fiber diameter of 4 to 400 nm, preferably 4 to 100 nm, and more preferably 4 to 50 nm are stably dispersed in a vulcanized rubber component without forming an aggregate. Therefore, the vulcanized rubber can achieve a high elastic modulus due to the reinforcing effect of the fine cellulose fibers, and at the same time, can achieve high breaking elongation as the small fiber diameter does not prevent the intrinsic elongation of the rubber. In other words, the vulcanized rubber of the present invention has high durability and high rigidity as a reinforcing rubber, and is suitably used for rubber goods such as tires. The dispersed state of the fine cellulose fibers in the vulcanized rubber of the present invention can be determined by observing a cross-section structure by SEM or the like.

In the tire of the present invention, it is only required that the vulcanized rubber of the present invention be used as some members of the tire, and there is no particular limitation, for example, on materials used for other specific structures or other members. Specifically, for example, in the tire of the present invention, the vulcanized rubber can be suitably applied to members such as belts, treads, sidewalls, bead fillers, carcasses, and chafers.

EXAMPLES

The present invention will now be described in more detail with reference to examples, but the present invention is not limited to the description of the following examples without departing from the spirit of the invention.

Note that hereinafter the amount of cationic groups introduced into cellulose was determined by the method described above. The number average fiber diameter and fiber length of fine cellulose fibers were measured as described below using an atomic force microscope (AFM).

Method: atomic force microscopy (tapping mode),

Probe: unmodified Si cantilever (NCH),

Environment: ambient atmosphere at room temperature (humidity: about 50%),

Apparatus: Digital Instrument Nanoscope III manufactured by Bruker,

Number of sampling data: 512×512 point,

Type of AFM image: height image, phase image (to recognize each fiber), Image analysis method: Fibers were traced in an AFM image to select the fibers one by one, and the maximum height of each fiber was measured as the thickness of the fiber. The average of the measured values was used as the number average fiber diameter. Furthermore, the fibers were traced in the AFM image to measure the perimeter, and the half of the perimeter was used the fiber length.

Production Example 1

Preparing Cationized Fine Cellulose Fiber Dispersion (1)

To an aqueous solution of 30 g of sodium hydroxide in 400 ml of water, 177 g of 65% by mass aqueous solution of 3-chloro-2-hydroxy-propyltrimethylammonium chloride (Catiomaster C (registered trademark), available from Yokkaichi Chemical Company, Limited) was added to prepare an aqueous solution. While stirring the aqueous solution, 29 g of bleached hardwood kraft pulp (LBKP, available from Oji Paper Co., Ltd., solids concentration: 34% by mass) was added portionwise as a cellulose fiber raw material, and stirred for 3 hours. After the stirring, the solution was filtered and washed with water until the filtrate became neutral. In this manner, cellulose fibers (1) into which cationic groups were introduced were obtained. In this cationized cellulose fibers (1), the amount of nitrogen introduced was 0.36% by mass, and the amount of cationic groups introduced was 0.24 mmol/g.

The cationized cellulose fibers (1) obtained were diluted with water to a solids concentration of 0.5% by mass, and defibrated at 20,000 rpm for 60 minutes using a rotary high-speed homogenizer (CLEARMIX 0.8S manufactured by M Technique Co., Ltd.). Furthermore, a dispersion containing the defibrated cationized fine cellulose fibers (1) was centrifuged at 10,000 rpm (12,000 G) for 10 minutes using a centrifugal separator (manufactured by Hitachi Koki Co., Ltd.) to give a cationized fine cellulose fiber dispersion (1). AFM observation showed that the number average fiber diameter of the cationized fine cellulose fibers (1) in the dispersion was 4.2 nm, and the number average fiber length was 800 nm.

Production Example 2

Preparing Cationized Fine Cellulose Fiber Dispersion (2)

Into a flask, 28.3 g of bleached hardwood kraft pulp (LBKP, available from Oji Paper Co., Ltd., solids concentration: 34% by mass) and 8 g of 25% aqueous sodium hydroxide solution was placed, and the resulting mixture was stirred for about 20 minutes until the aqueous sodium hydroxide solution was infiltrated sufficiently into the pulp. One hundred grams of isopropyl alcohol and 8.54 g of 65% by mass aqueous solution of 3-chloro-2-hydroxy-propyltrimethylammonium chloride (Catiomaster C (registered trademark), available from Yokkaichi Chemical Company, Limited) were then added thereto, and the resulting mixture was stirred at 70° C. for 90 minutes while being kept under a blanket of nitrogen. The resulting mixture was cooled, neutralized with acetic acid, and repeatedly washed with isopropyl alcohol and water to give a cellulose fiber dispersion (2) into which cationic groups were introduced. In this cationized cellulose fibers (2), the amount of nitrogen introduced was 0.9% by mass, and the amount of cationic groups introduced was 0.64 mmol/g.

The cationized cellulose fibers (2) obtained were defibrated and centrifuged in the same manner as in Production Example 1 to give a cationized fine cellulose fiber dispersion (2). AFM observation showed that the number average fiber diameter of the cationized fine cellulose fibers (2) in the dispersion was 3.8 nm, and the number average fiber length was 480 nm.

Comparative Example 1

Fifty grams of natural rubber (NR) latex (field latex, pH: 10.8, solids concentration: 20% by mass) was dried in a vacuum oven at 60° C. for 6 hours to give a dry rubber composition. To the dry rubber composition, other components shown in the following table were added, and normal kneading was performed using a laboratory kneader. The resulting mixture was press vulcanized to give a vulcanized rubber sheet of Comparative Example 1.

Comparative Example 2

To 200 g of an unmodified fine cellulose fiber dispersion (liquid: water, average fiber diameter: 16 nm, solids concentration: 0.25% by mass), 50 g of natural rubber (NR) latex (field latex, pH: 10.8, solids concentration: 20% by mass) was added and stirred at 11000 rpm for 10 minutes using a homogenizer (ULTRA-TURRAX manufactured by IKA). Thereafter, the resulting mixture was dried in a vacuum oven at 60° C. for 6 hours to give a dry rubber composition. To the dry rubber composition, other components shown in the following table were added, and normal kneading was performed using a laboratory kneader. The resulting mixture was press vulcanized to give a vulcanized rubber sheet of Comparative Example 2.

Example 1

The same procedure as in Comparative Example 2 was repeated except that 556 g of the cationized fine cellulose fiber dispersion (1) (liquid: water, number average fiber diameter: 4.2 nm, number average fiber length: 800 nm, aspect ratio: 190, solids concentration: 0.09% by mass, amount of cation introduced: 0.24 mmol/g) was substituted for the unmodified fine cellulose fiber dispersion to give a vulcanized rubber sheet of Example 1.

Comparative Example 3

Fifty grams of natural rubber (NR) latex (field latex, pH: 10.8, solids concentration: 20% by mass) was dried in a vacuum oven at 60° C. for 6 hours to give a dry rubber composition. To the dry rubber composition, 4.2 g of carbon black and other components shown in the following table were added, and normal kneading was performed using a laboratory kneader. The resulting mixture was press vulcanized to give a vulcanized rubber sheet of Comparative Example 3.

Example 2

The cationized fine cellulose fiber dispersion (1) in an amount of 556 g was added to 50 g of natural rubber (NR) latex (field latex, pH: 10.8, solids concentration: 20% by mass) and stirred at 11000 rpm for 10 minutes using a homogenizer. The resulting masterbatch was dried in a vacuum oven at 60° C. for 6 hours to give a dry rubber composition. To the dry rubber composition, 4.2 g of carbon black and other components shown in the following table were added, and normal kneading was performed using a laboratory kneader. The resulting mixture was press vulcanized to give a vulcanized rubber sheet of Example 2.

Comparative Example 4

Using a homogenizer, 4.2 g of carbon black and 500 ml of distilled water were stirred at 11000 rpm for 10 minutes. To this carbon black slurry, 50 g of natural rubber (NR) latex (field latex, pH: 10.8, solids concentration: 20% by mass) was added and stirred at 11000 rpm for 10 minutes using a homogenizer. The resulting masterbatch was dried in a vacuum oven at 60° C. for 6 hours to give a dry rubber composition. To the dry rubber composition, other components shown in the following table were added, and normal kneading was performed using a laboratory kneader. The resulting mixture was press vulcanized to give a vulcanized rubber sheet of Comparative Example 4.

Example 3

Using a homogenizer, 4.2 g of carbon black and 500 ml of distilled water were stirred at 11000 rpm for 10 minutes. To this carbon black slurry, 556 g of the cationized fine cellulose fiber dispersion (1) was added and stirred at 11000 rpm for 10 minutes using a homogenizer. Further to this mixture, 50 g of natural rubber (NR) latex (field latex, pH: 10.8, solids concentration: 20% by mass) was added and stirred at 11000 rpm for 10 minutes using a homogenizer. The resulting masterbatch was then dried in a vacuum oven at 60° C. for 6 hours to give a dry rubber composition. To the dry rubber composition, other components shown in the following table were added, and normal kneading was performed using a laboratory kneader. The resulting mixture was press vulcanized to give a vulcanized rubber sheet of Example 3.

For the vulcanized rubber sheets obtained, a tensile test was performed at a temperature of 23° C. in accordance with ASTM D412 to measure the tensile stress at 300% elongation (300% modulus (M300)) and the strength at break (Tb) of the vulcanized rubber sheets. Furthermore, using a viscoelasticity tester ARES manufactured by Rheometrics, the storage modulus G' (MPa) and the loss tangent (tan δ) at 10% dynamic strain were measured at a temperature of 50° C., a humidity of 10% RH, and a measuring frequency of 15 Hz. The measurements were expressed as an index number taking the values of Comparative Example 1 as 100. For all the values, larger values indicate better results. The results are shown in the following table.

TABLE 1

|  |  | Comparative Example 1 | Comparative Example 2 | Example 1 | Comparative Example 3 | Example 2 | Comparative Example 4 | Example 3 |
|---|---|---|---|---|---|---|---|---|
| Components (parts by mass) | NR | 100 | 100 | 100 | 100 | 100 | 100 | 100 |
|  | Fine cellulose fibers (surface treated) | — | — | 5 | — | 5 | — | 5 |
|  | Fine cellulose fibers (untreated) | — | 5 | — | — | — | — | — |
|  | Carbon black | — | — | — | 42 | 42 | — | — |
|  | Carbon black slurry | — | — | — | — | — | 42 | 42 |
|  | Zinc white | 2.5 | 2.5 | 2.5 | 2.5 | 2.5 | 2.5 | 2.5 |
|  | Stearic acid | 2 | 2 | 2 | 2 | 2 | 2 | 2 |
|  | Vulcanization accelerator[*1] | 1.5 | 1.5 | 1.5 | 1.5 | 1.5 | 1.5 | 1.5 |
|  | Age resistor[*2] | 2 | 2 | 2 | 2 | 2 | 2 | 2 |
|  | Sulfur | 1.5 | 1.5 | 1.5 | 1.5 | 1.5 | 1.5 | 1.5 |
| Evaluation results (index number) | Strength at break Tb | 100 | 60 | 115 | 126 | 140 | 131 | 157 |
|  | M300 | 100 | 428 | 410 | 332 | 1325 | 664 | 1431 |
|  | Storage modulus G' | 100 | 238 | 162 | 444 | 496 | 373 | 556 |
|  | Loss tangent tanδ | 100 | 102 | 138 | 359 | 358 | 416 | 415 |

[*1]Vulcanization accelerator: (Nocceler NS-P available from Ouchi Shinko Chemical Industrial Co., Ltd.)
[*2]Age resistor: (Nocrac 6C available from Ouchi Shinko Chemical Industrial Co., Ltd.)

As shown in the above table, it was confirmed that the rubber compositions of Examples according to the present invention had good dispersibility of cellulose fibers, and had well-balanced good physical property values as compared to those of the rubber compositions of Comparative Examples obtained by conventional methods.

Example 4

The same procedure as in Example 3 was repeated that except that the amount of the cationized fine cellulose fiber dispersion (1) was 1112 g to give a vulcanized rubber sheet of Example 4.

Comparative Example 5

The same procedure as in Example 3 was repeated except that 400 g of an unmodified fine cellulose fiber dispersion (liquid: water, average fiber diameter: 16 nm, solids concentration: 0.25% by mass) was substituted for the cationized fine cellulose fiber dispersion (1) to give a vulcanized rubber sheet of Comparative Example 5.

For the vulcanized rubber sheets obtained, tensile stress at 300% elongation (300% modulus (M300)), strength at break (Tb), storage modulus G' (MPa), and loss tangent (tan δ) were measured in the same manner as in Example 1 and other examples. The measurements were expressed as an index number taking the values of Comparative Example 1 as 100. For the index numbers of 300% modulus, strength at break, and storage modulus, larger values indicate better results, and for the index number of tan δ, smaller values indicate better results. The results are shown in the following table.

TABLE 2

|  |  | Example 4 | Comparative Example 5 |
|---|---|---|---|
| Components (parts by mass) | NR | 100 | 100 |
|  | Fine cellulose fibers (surface treated) | 10 | — |
|  | Fine cellulose fibers (untreated) | — | 10 |
|  | Carbon black | — | — |

TABLE 2-continued

|  |  | Example 4 | Comparative Example 5 |
|---|---|---|---|
|  | Carbon black slurry | 42 | 42 |
|  | Zinc white | 2.5 | 2.5 |
|  | Stearic acid | 2 | 2 |
|  | Vulcanization accelerator[*1] | 1.5 | 1.5 |
|  | Age resistor[*2] | 2 | 2 |
|  | Sulfur | 1.5 | 1.5 |
| Evaluation results (index number) | Strength at break Tb | 130 | 71 |
|  | M300 | 1800 | 2012 |
|  | Storage modulus G' | 920 | 1013 |
|  | Loss tangent tanδ | 810 | 621 |

As shown in the above table, it was confirmed that in the rubber composition of Example 4 according to the present invention, increasing the amount of cationized fine cellulose fibers significantly improved the values of 300% modulus and storage modulus. On the other hand, the rubber composition of Comparative Example 5 obtained using untreated fine cellulose fibers in place of the cationized fine cellulose fibers of Example 4, although having improved values of 300% modulus and storage modulus, had significantly poor strength at break.

Example 5

To 16 g of natural rubber (NR) latex (solids concentration: 61% by mass), 556 g of the cationized fine cellulose fiber dispersion (1) was added, and then stirred and mixed at 11,000 rpm for 10 minutes using a homogenizer (ULTRA-TURRAX T25 manufactured by IKA) to give a rubber-cellulose dispersion (1). The rubber-cellulose dispersion (1) was placed into a separatory funnel and allowed to stand for 60 minutes, after which the dispersion was confirmed to have separated into two layers. The transparent lower layer was removed and recovered to weigh its mass; 40% of water was recovered.

The upper layer was then recovered, placed in a vat, and dried in an oven at 110° C. to remove residual water, thereby obtaining a rubber composition (1). To the rubber composition (1), other components: 3 parts by mass of zinc white (zinc white No. 1, available from Asaoka Yogyo Genryo Co., LTD.), 1 part by mass of a vulcanization accelerator (N-tert-butyl-2-benzothiazole sulfenamide, available from Wako Pure Chemical Industries, Ltd.), 2 parts by mass of sulfur (5% oil-treated powdered sulfur, available from Tsurumi Chemical Industry Co., LTD.), and 3 parts by mass of stearic acid (available from Wako Pure Chemical Industries, Ltd.) were added, and normal kneading was performed using a laboratory kneader. Specifically, stearic acid and zinc white were added to the rubber composition (1) and kneaded at 140° C. for 3 minutes using a kneader (LABO PLASTO-MILL μ, manufactured by Toyo Seiki Seisaku-Sho, Ltd.). The vulcanization accelerator and sulfur were further added and kneaded at 80° C. for 3 minutes. The resulting mixture was press vulcanized at 160° C. for 10 minutes to give a vulcanized rubber composition (1) with a thickness of 1 mm. The dispersibility of the vulcanized rubber composition (1) was observed under a light microscope (400×), and it was well dispersed.

Example 6

The same procedure as in Example 5 was repeated except that the cationized fine cellulose fiber dispersion (1) and rubber latex were mixed at 11,000 rpm for 60 minutes to prepare rubber-cellulose dispersion (2). The rubber-cellulose dispersion (2) was placed into a separatory funnel, and the dispersion rapidly separated into two layers. The transparent lower layer was removed and recovered to weigh its mass; 56% of water was recovered.

Furthermore, similarly to Example 5, the upper layer of the dispersion was dried (a rubber composition (2)); other components were mixed therewith by kneading; and then the resulting mixture was press vulcanized to give a vulcanized rubber composition (2). The dispersibility of the vulcanized rubber composition (2) was observed under a light microscope (400×), and it was well dispersed.

Example 7

The same procedure as in Example 5 was repeated except that the cationized fine cellulose fiber dispersion (2) (liquid: water, number average fiber diameter: 3.8 nm, number average fiber length: 480 nm, aspect ratio: 190, solids concentration: 0.09%, amount of cation introduced: 0.64 mmol/g) was mixed with rubber latex to give a rubber-cellulose dispersion (3). The rubber-cellulose dispersion (3) was placed into a separatory funnel, and after 5 minutes, it was observed that the dispersion separated into two layers. The transparent lower layer was removed and recovered to weigh its mass; 67% of water was recovered.

Furthermore, similarly to Example 5, the upper layer of the dispersion was dried (a rubber composition (3)); other components were mixed therewith by kneading; and then the resulting mixture was press vulcanized to give a vulcanized rubber composition (3).

Reference Example 1

The natural rubber latex used in Example 5 was placed in a vat and dried at 110° C. to give a rubber composition (4). Next, similarly to Example 5, other components were mixed therewith by kneading, and then the resulting mixture was press vulcanized to give a vulcanized rubber composition (4).

The vulcanized rubber compositions (1) to (4) obtained were each stamped into a predetermined dumbbell-shaped specimen to measure the elongation at break, strength at break (Tb), and tensile stress at 300% elongation (300% modulus (M300)) by a tensile test in accordance with JIS K 6251. The measurements were expressed as an index number taking the values of Reference Example 1 as 100. For all the values, larger values indicate better results with more excellent reinforcement properties. The results are shown in the following table.

TABLE 3

|  |  | Reference Example 1 | Example 5 | Example 6 | Example 7 |
|---|---|---|---|---|---|
| Components of rubber composition (parts by mass) | NR | 100 | 100 | 100 | 100 |
|  | Cellulose fibers (1) | — | 5 | 5 | — |
|  | Cellulose fibers (2) | — | — | — | 5 |
| Separation of dispersion |  | — | Yes | Yes | Yes |
| Evaluation results of physical properties (index number) | Elongation at break | 100 | 82 | 82 | 91 |
|  | Strength at break Tb | 100 | 176 | 161 | 179 |
|  | M300 | 100 | 500 | 429 | 325 |

As shown in the above table, the vulcanized rubber compositions obtained by the manufacturing method of the present invention have good mechanical properties compared to the vulcanized rubber composition obtained in Reference Example not using the manufacturing method of the present invention. Furthermore, according to the manufacturing method of the present invention, water in the dispersion can be removed efficiently, which can be expected to contribute to the reduction in manufacturing cost.

DESCRIPTION OF SYMBOLS

1A: Uncationized short fiber
1B: Cationized short fiber
2: Rubber particle

The invention claimed is:
1. A method for manufacturing a rubber composition comprising a rubber component and short fibers, wherein the short fibers are cationized, the method comprising:
a mixing step for mixing the cationized short fibers and rubber latex to prepare a rubber-short fiber mixed solution; and
a drying step for drying the rubber-short fiber mixed solution to give a rubber composition, and
wherein the short fibers are fine cellulose fibers.
2. The method for manufacturing the rubber composition according to claim 1, wherein in the mixing step for mixing the cationized short fibers and rubber latex to prepare the rubber-short fiber mixed solution, the rubber-short fiber mixed solution is separated into two layers.

3. The method for manufacturing the rubber composition according to claim 2, wherein in the mixing step, after the rubber-short fiber mixed solution is separated into two layers, a layer composed mainly of water is removed.

4. The method for manufacturing the rubber composition according to claim 1, wherein prior to the mixing step, the cationized short fibers are added into a liquid to prepare a short fiber dispersion, and in the mixing step, the short fiber dispersion and the rubber latex are mixed.

5. The method for manufacturing the rubber composition according to claim 1, wherein in the mixing step, at least one dispersant selected from the group consisting of carbon black and inorganic compounds is further added.

6. The method for manufacturing the rubber composition according to claim 5, wherein the amount of the dispersant is 0.1 to 100 times the amount of the cationized short fibers.

7. The method for manufacturing the rubber composition according to claim 5, wherein in the mixing step, the dispersant is mixed with the mixture of the cationized short fibers and the rubber latex.

8. The method for manufacturing the rubber composition according to claim 5, wherein prior to the mixing step, the dispersant is added into a liquid, to prepare a dispersant dispersion, and in the mixing step, the dispersant dispersion is mixed.

9. The method for manufacturing the rubber composition according to claim 1, wherein the amount of the cationized short fibers is 0.1 to 50 parts by mass based on 100 parts by mass of the rubber component.

\* \* \* \* \*